United States Patent
Joseph et al.

(10) Patent No.: US 10,637,768 B1
(45) Date of Patent: Apr. 28, 2020

(54) ENABLING NON-FLEXIBLE-ALGORITHM ROUTERS TO PARTICIPATE IN FLEXIBLE-ALGORITHM ROUTING PROTOCOLS

(71) Applicant: Juniper Networks, Inc., Sunnyvale, CA (US)

(72) Inventors: William Britto Arimboor Joseph, Bangalore (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/223,946

(22) Filed: Dec. 18, 2018

(30) Foreign Application Priority Data

Nov. 2, 2018 (IN) .............................. 201841041514

(51) Int. Cl.
| | | |
|---|---|---|
| *H04L 12/721* | (2013.01) | |
| *H04L 12/723* | (2013.01) | |
| *H04L 12/773* | (2013.01) | |
| *H04L 12/801* | (2013.01) | |
| *H04L 12/781* | (2013.01) | |

(52) U.S. Cl.
CPC .......... *H04L 45/127* (2013.01); *H04L 45/507* (2013.01); *H04L 45/52* (2013.01); *H04L 45/60* (2013.01); *H04L 47/17* (2013.01)

(58) Field of Classification Search
CPC ..... H04L 45/127; H04L 45/507; H04L 45/52; H04L 45/60; H04L 47/17
See application file for complete search history.

(56) References Cited

U.S. PATENT DOCUMENTS

| 10,469,372 B2* | 11/2019 | Filsfils | .................. H04L 45/125 |
| 2013/0007286 A1* | 1/2013 | Mehta | .................. H04W 76/10 |
| | | | 709/227 |
| 2018/0227212 A1* | 8/2018 | Ferguson | ............ H04L 12/4625 |

OTHER PUBLICATIONS

Psenak et al.; ISIS Segment Routing Flexible Algorithm; Network Working Group, Oct. 23, 2017 (Year: 2017).*
Previdi et al.; IS-IS Extensions for Segmlent Routing; IS-IS for IP Internets, Apr. 27, 2017 (Year: 2017).*
Coltun et al. "OSPF for IPv6" Network Working Group, RFC 5340, Jul. 2008, 94 pp.
Filsfils et al., "Segment Routing Architecture," Network Working Group, draft-filsfills-rtgwg-segment-routing-00, Jun. 28, 2013, 28 pp.
Filsfils et al., "Segment Routing Architecture," Network Working Group, draft-filsfils-spring-segment-routing-04, Jul. 3, 2014, 18 pp.

(Continued)

*Primary Examiner* — Kashif Siddiqui
(74) *Attorney, Agent, or Firm* — Shumaker & Sieffert, P.A.

(57) ABSTRACT

Techniques are described for facilitating the inclusion of a non-flexible-algorithm router to be included in flexible-algorithm path computations. For example, a flexible-algorithm router advertises information associated with a non-flexible-algorithm router to other flexible-algorithm routers in the network such that the flexible-algorithm routers may include the non-flexible-algorithm router when computing a path based on flexible-algorithm. During path computation, if the router determines that its next-hop router is the non-flexible-algorithm router, the router may configure additional forwarding information to cause the router to steer traffic to the non-flexible-algorithm router.

20 Claims, 4 Drawing Sheets

(56) References Cited

OTHER PUBLICATIONS

Filsfils et al., "Segment Routing Use Cases," Network Working Group, draft-filsfills-rtgwg-segment-routing-use-cases-01, Jul. 14, 2013, 46 pp.

Filsfils et al., "Segment Routing with MPLS Data Plane," Network Working Group, draft-filsfils-spring-segment-routing-mpls-03, Jul. 31, 2014, 14 pp.

Ginsberg et al. "IS-IS Extensions for Advertising Router Information" RFC 7981, Internet Engineering Task Force (IETF), Oct. 2016, 10 pp.

Li et al. "IGP Requirements for Traffic Engineering with MPLS" draft-li-mpls-igp-te-00.txt, Network Working Group, Internet Draft, Feb. 1999, 6 pp.

Lindem et al. "Extensions to OSPF for Advertising Optional Router Capabilities" RFC 7770, Internet Engineering Task Force (IETF), Feb. 2016, 15 pp.

Lindem et al. "OSPFv3 LSA Extendibility" draft-acee-ospfv3-lsa-extend.01.txt, IETF Trust, Network Working Group, Jul. 15, 2013, 27 pp.

Moy "OSPF Version 2" RFC 2328, Network Working Group, Apr. 1998, 244 pp.

Oran, David, "OSI ISIS Intradomain Routing Protocol" Network Working Group, RFC 1142, Feb. 1990, 157 pp.

Previdi et al., "Source Packet Routing in Networking (SPRING) Problem Statement and Requirements," RFC 7855, Internet Engineering Task Force (IETF), May 2016, 19 pp.

Psenak et al. "IGP Flexible Algorithm" Network Working Group, draft-ietf-lsr-flex-algo-00.txt, May 15, 2018, 23 pp.

Sheth et al. "OSPF Hybrid Broadcast and Point-to-Multipoint Interface Type" Internet Engineering Task Force (IETF), RFC 6845, Jan. 2013, 9 pp.

Extended Search Report from counterpart European Application No. 19180555.5, dated Nov. 28, 2019, 8 pp.

Previdi et al., "BGP Link-State extensions for Segment Routing; draft-ietf-idr-bgp-ls-segment-routing-ext-11," Internet-Draft, IETF Trust, Oct. 22, 2018, 29 pp.

Talaulikar et al., " Flexible Algorithm Definition Advertisement with BGP Link-State; draft-ketant-idr-bgp-ls-flex-algo-OO," Internet-Draft, IETF Trust, Jul. 1, 2018, 10 pp.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type = 149    |     Length    |0|0|           |    RESERVED   |
+-+-+-+-+-+-+-+-+-+-+-+-+-+-+-+-+-+-+-+-+-+-+-+-+-+-+-+-+-+-+-+-+
|          Range = 1            |      /32      |       7       |
+-+-+-+-+-+-+-+-+-+-+-+-+-+-+-+-+-+-+-+-+-+-+-+-+-+-+-+-+-+-+-+-+
|      .7       |      .7       |      .7       |Prefix-SID Type|
+-+-+-+-+-+-+-+-+-+-+-+-+-+-+-+-+-+-+-+-+-+-+-+-+-+-+-+-+-+-+-+-+
| sub-TLV Length|     Flags     |   Algo = 128  |               |
+-+-+-+-+-+-+-+-+-+-+-+-+-+-+-+-+-+-+-+-+-+-+-+-+-+-+-+-+-+-+-+-+
|                         Index = 807                           |
+-+-+-+-+-+-+-+-+-+-+-+-+-+-+-+-+-+-+-+-+-+-+-+-+-+-+-+-+-+-+-+-+
SID/Label Binding TLV for ISIS
```

FIG. 2A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type = 2             |            Length             |
+-+-+-+-+-+-+-+-+-+-+-+-+-+-+-+-+-+-+-+-+-+-+-+-+-+-+-+-+-+-+-+-+
| Prefix Length |      AF       |       Range Size = 1          |
+-+-+-+-+-+-+-+-+-+-+-+-+-+-+-+-+-+-+-+-+-+-+-+-+-+-+-+-+-+-+-+-+
|    Flags      |                   Reserved                    |
+-+-+-+-+-+-+-+-+-+-+-+-+-+-+-+-+-+-+-+-+-+-+-+-+-+-+-+-+-+-+-+-+
|                   Address Prefix = 7.7.7.7                    |
+-+-+-+-+-+-+-+-+-+-+-+-+-+-+-+-+-+-+-+-+-+-+-+-+-+-+-+-+-+-+-+-+
|          Type = 2             |            Length             |
+-+-+-+-+-+-+-+-+-+-+-+-+-+-+-+-+-+-+-+-+-+-+-+-+-+-+-+-+-+-+-+-+
|     Flags     |   Reserved    |     MT-ID     |   Algo = 128  |
+-+-+-+-+-+-+-+-+-+-+-+-+-+-+-+-+-+-+-+-+-+-+-+-+-+-+-+-+-+-+-+-+
|                         Index = 807                           |
+-+-+-+-+-+-+-+-+-+-+-+-+-+-+-+-+-+-+-+-+-+-+-+-+-+-+-+-+-+-+-+-+
Extended Prefix Range TLV for OSPF
```

ENABLING NON-FLEXIBLE-ALGORITHM ROUTERS TO PARTICIPATE IN FLEXIBLE-ALGORITHM ROUTING PROTOCOLS

This application claims the benefit of Indian Provisional Patent Application No. 201841041514, filed on Nov. 2, 2018, the entire content of which is incorporated herein by reference.

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain. The contents of a Link State Database (LSDB) or a Traffic Engineering Database (TED) maintained in accordance with a link state routing protocol have the scope of an IGP domain. IGP routing protocols typically require that all routers in the IGP routing domain store within an internal LSDB or TED all of the routing information that has been distributed according to the IGP protocol. In operation, each router typically maintains an internal link state database and scans the entire database at a defined interval to generate and output link state messages to synchronize the database to neighboring routers within the routing domain. In this way, link state is propagated across the entire routing domain and stored in full at each router within the domain.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Resource Reservation Protocol with Traffic Engineering (RSVP-TE), label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

Routers may further employ segment routing techniques, such as by using a Source Packet Routing in Networking (SPRING) protocol, that provide segment routing within an IGP domain to advertise single or multi-hop LSPs. SPRING includes multiple different label types including "adjacency" labels and "node" labels. To forward a packet through the network, the routers may push, pop, or swap one or more labels in a label stack, e.g., a segment list, that is applied to the packet as it is forwarded through the network.

Routers that support segment routing techniques may also support constraint-based path computation in which path computations is performed based on various constraints, such as to configure a path on a particular plane of a network deployed with multiple planes. One example of path computation is so called "flexible-algorithm techniques" in which the router performs path computation based on a calculation-type, metric-type, and a set of constraints. For example, calculation-type may include Shortest Path First or other calculation of a path. The metric-type may include the type of metric used to compute the best paths along the constrained topology. The set of constraints may restrict paths to links with specific affinities or avoid links with specific affinities. Routers that implement flexible algorithm techniques may steer traffic along the constraint-based segment routing paths.

SUMMARY

In general, techniques are described for facilitating the inclusion of a router that is not enabled for flexible-algorithm path computations (referred to herein as, "non-flexible-algorithm router") to be included in flexible-algorithm path computations. For example, a router that is enabled for flexible-algorithm path computations (referred to herein as, "flexible-algorithm router") advertises information associated with a non-flexible-algorithm router to other flexible-algorithm routers in the network such that when performing path computation, the non-flexible-algorithm router is included. As one example, one of the flexible-algorithm routers (referred to herein as "segment routing mapping server (SRMS)") may advertise to other routers that are enabled for the flexible-algorithm path computations a routing packet (referred to herein as "SRMS packet") including a loopback address of the non-flexible-algorithm router, a flexible-algorithm segment identifier ("flexible-algorithm SID") and flexible-algorithm definition for which the non-flexible-algorithm router is to be considered for path computation, and a node SID of the non-flexible-algorithm router associated with the flexible-algorithm (collectively, "non-flexible-algorithm router information"). As one example, the SRMS may include the non-flexible-algorithm router information within a type, length, and values ("TLV") of an Open Shortest Path First (OSPF) packet or a sub-TLV of an Intermediate System-Intermediate System (ISIS) packet.

A router receiving the SRMS packet may determine whether the router is enabled for the flexible-algorithm path computation identified in the SRMS packet. If the router is enabled for the identified flexible-algorithm path computation, the router stores the non-flexible-algorithm router information such that the router may include the non-flexible-algorithm router information during path computation. If the router is not enabled for the identified flexible-algorithm path computation, the router ignores the SRMS packet. During path computation, each router that stores the non-flexible-algorithm router information determines whether its next-hop router is a router that is enabled for the flexible-algorithm path computation or whether the next-hop router is in the flexible-algorithm topology by virtue of the SRMS packet. If a router determines that the next-hop router is the router identified in the SRMS packet, the router may configure additional forwarding information to cause the router to steer traffic to the non-flexible-algorithm router. As one example, the router may configure forwarding information that causes the router to push an adjacency label associated with the non-flexible-algorithm router.

The techniques may provide one or more example technical advantages. For example, by using existing TLVs for ISIS or OSPF, no protocol change is required to implement flexible-algorithm for routers that do not support or enable flexible-algorithm. Moreover, in a multi-vendor network where one or more of the routers do not support flexible-algorithm, the techniques described herein simplifies implementation of flexible-algorithm by enabling the implementation of flexible-algorithm in phases without having to implement flexible-algorithm for all the routers in the network at the same time.

In one example, a method includes generating, by a network device of a plurality of network devices enabled for a flexible-algorithm path computation, a packet including information identifying a non-flexible-algorithm network device that is not enabled for the flexible-algorithm path computation, wherein the information comprises a loopback address of the non-flexible-algorithm network device, an identifier for the flexible-algorithm path computation, and an identifier that identifies the non-flexible-algorithm network device for the flexible-algorithm path computation; and sending, by the network device and to at least one other network device of the plurality of network devices, the packet to cause the at least one other network device to include the non-flexible-algorithm network device in the flexible-algorithm path computation.

In another example, a method includes receiving, by a network device of a plurality of network devices enabled for a flexible-algorithm path computation, a packet including information identifying a non-flexible-algorithm network device that is not enabled for the flexible-algorithm path computation, wherein the information comprises a loopback address of the non-flexible-algorithm network device, an identifier for the flexible-algorithm path computation, and an identifier for the non-flexible-algorithm network device for the flexible-algorithm path computation; determining, by the network device, whether the network device is associated with the identifier for the flexible-algorithm path computation included in the packet; and performing, by the network device and in response to determining that the network device is associated with the identifier for the flexible-algorithm path computation included in the packet, the flexible-algorithm path computation including the non-flexible-algorithm network device.

In another example, a network device of a plurality of network devices enabled for a flexible-algorithm path computation includes a memory; one or more programmable processors operably coupled to the memory, wherein the one or more programmable processors are configured to: generate a packet including information identifying a non-flexible-algorithm network device that is not enabled for the flexible-algorithm path computation, wherein the information comprises a loopback address of the non-flexible-algorithm network device, an identifier for the flexible-algorithm path computation, and an identifier that identifies the non-flexible-algorithm network device for the flexible-algorithm path computation; and send, to at least one other network device of the plurality of network devices, the packet to cause the at least one other network device to include the non-flexible-algorithm network device in the flexible-algorithm path computation.

The details of one or more examples are set forth in the accompanying drawings and the description below. Other features, objects, and advantages will be apparent from the description and drawings, and from the claims.

BRIEF DESCRIPTION OF DRAWINGS

FIG. 2A illustrates an example Intermediate System-Intermediate System (ISIS) packet including a Type/Length/Value (TLV) that includes non-flexible-algorithm routing information, in accordance with techniques described herein.

FIG. 2B illustrates an example Open Shortest Path First (OSFP) packet including Type/Length/Value (TLV) that includes non-flexible-algorithm routing information, in accordance with techniques described herein.

DETAILED DESCRIPTION

Figure 1:
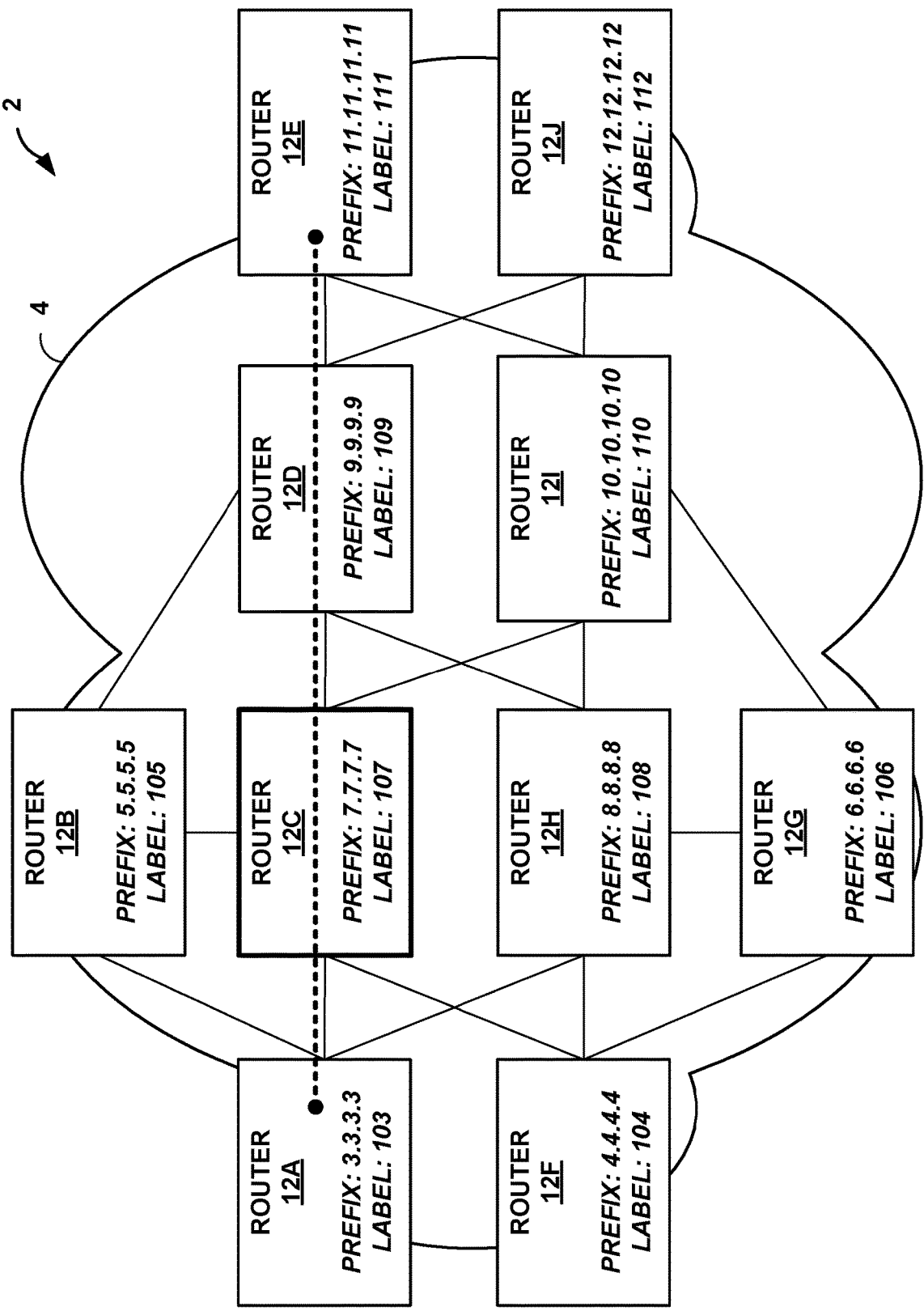
FIG. 1 is a block diagram illustrating an example system for facilitating the inclusion of a router that is not enabled for flexible-algorithm in flexible-algorithm path computations, in accordance with techniques described herein.

FIG. 1 is a block diagram illustrating an example system 2 that includes a computer network 4 for facilitating the inclusion of a router that is not enabled for flexible-algorithm (referred to herein as, "non-flexible-algorithm router") in flexible-algorithm path computations, in accordance with techniques described in this disclosure. Network 4 may include network devices, e.g., PE routers 12A-12J ("routers 12"), to establish one or more label switched paths ("LSPs") that define distinct paths through network 4 to carry packets from a source PE router (e.g., ingress routers 12A or 12F) to a destination PE router (e.g., egress routers 12E or 12J).

The sources of the network traffic received by ingress router 12A or router 12F may comprise one or more devices (not shown) and/or any public or private network or the Internet that provides traffic to ingress routers 12A or 12F in network 4. The destinations of the network traffic being forwarded on LSPs may comprise one or more destination devices and/or network that may include LANs or wide area networks (WANs) that comprise a plurality of devices reachable by egress routers 12E or 12J. Destination devices may include personal computers, laptops, workstations, personal digital assistants (PDAs), wireless devices, network-ready appliances, file servers, print servers or other devices that access the source via network 4.

In the example of FIG. 1, routers 12 may use segment routing techniques, e.g., Source Packet Routing in Networking (SPRING) protocol, for establishing an LSP. For example, segment routing techniques are used to configure labels for paths from ingress router 12A to egress router 12E or from ingress router 12F to egress router 12J. Segment routing within an IGP domain (e.g., network 4) allows routers to advertise single or multi-hop LSPs within the IGP domain such as a segment routing LSP. For segment routing, the "path" information is disseminated between the routers as part of the IGP link state information for the domain. Routers are able to steer packets through a controlled set of instructions, called segments, by prepending a segment routing header (e.g., label/segment identifier (SID)) to the packets. Segment routing allows routers to enforce a flow through any topological path and service chain while maintaining per-flow state only at the ingress node to the segment routing domain.

One potential advantage of segment routing may be that the segment routing architecture can be directly applied to the Multi-Protocol Label Switching (MPLS) data plane with no change in the forwarding plane. A network administrator need only allocate one node segment per router and the segment routing Interior Gateway Protocol (IGP) control-plane automatically builds the required MPLS forwarding constructs from a router to any other router. Segment routing is further described in Filsfils et. al., "Segment Routing Architecture," Internet-Draft draft-filsfils-rtgwg-segment-routing-00, June 2013, while Segment Routing use cases are described in Filsfils et. al., "Segment Routing Use Cases," Internet-Draft draft-filsfils-rtgwg-segment-routing-use-cases-01, July 2013, the entire contents of each of which are incorporated herein by reference. Further details regarding SPRING are found in (1) "Segment Routing Architecture," IETF draft: draft-filsfils-spring-segment-routing-04, Jul. 3, 2014; (2) S. Previdi, et al., "Source Packet Routing in Networking (SPRING) Problem Statement and Requirements," RFC 7855, May 2016; and (3) "Segment Routing with MPLS data plane," IETF draft: draft-filsfils-spring-segment-routing-mpls-03, Jul. 31, 2014, the entire contents of each of which are incorporated by reference herein.

In the example of FIG. 1, routers 12 that are included in a segment routing domain may exchange labels in accordance with the SPRING protocol. Routers 12 operate as label switching routers (LSRs) that distribute labels to neighboring LSRs within network 4 to support SPRING forwarding along routed paths within network 4. As further described below, SPRING includes multiple different label types including "adjacency" labels and "node" labels. To forward a packet through network 4, routers that are SPRING enabled may push, pop, or swap one or more labels in a label stack (e.g., a "segment list") that is applied to the packet as it is forwarded through network 4. The label stack may encode the topological and service source route of the packet.

An adjacency label (otherwise referred to herein as "adjacency segment identifier (SID)") may have a local semantic to a particular segment routing node, such as one of routers 12. In particular, an adjacency label steers traffic onto an adjacency (e.g., communication link and/or interface) or set of adjacencies. Thus, an adjacency label may be related to a particular router. To use an adjacency label, a router may initially assign the adjacency label to a particular adjacency and advertise the adjacency label to other routers in the segment routing domain using Intermediate System-Intermediate System (ISIS) protocol or the Open Shortest Path First (OSPF) protocol. The router may be the only router in the segment routing domain to use the particular adjacency label. When a router forwards a packet using the adjacency label, the router may cause the packet to use the adjacency for the router associated with the adjacency label. In this way, adjacency labels may be used to establish one-hop tunnels within network 4.

A node label (otherwise referred to herein as "node SID"), by contrast, may have a global semantic within a segment routing domain. That is, each of routers 12 that are SPRING enabled may be assigned a defined node label range (commonly referred to as Segment Routing Global Block (SRGB)) that is unique to each respective router within the segment routing domain. An operator of network 4 may ensure unique allocation of the different node label ranges from a global range to different routers. In addition to a node label range, each particular router may also have a specific node segment identifier that uniquely identifies the particular router in the segment routing domain. Each respective router may advertise its respective node segment identifier and node label range to other routers in the segment routing domain using ISIS or OSPF. For examples described in this disclosure, each of routers 12 may advertise a node label added to the starting label of the SRGB.

Based on routes determined using, e.g., shortest path routing, each of routers 12 may configure its forwarding state to push, pop, or swap node labels (corresponding to other nodes in the network) onto packets to forward such packets using the determined route to the destination. For instance, each of routers 12 may perform path selection using topology information learned by way of IGP to compute a shortest path within network 4 on a hop-by-hop basis based on the routing information maintained by the routers. Each of routers 12 may then select a next hop along the locally computed shortest path and install forwarding information associated with the selected next hop in a forwarding plane of the router, wherein the forwarding information identifies a network interface to be used when forwarding traffic and one or more labels to be applied when forwarding the traffic out the interface. The routers use the next hops with the assigned labels to forward traffic hop-by-hop.

In some examples, routers 12 may further support constraint-based path computation (e.g., flexible-algorithm) for segment routing. A type of constraint may be to compute a path along a subset of routers of a particular plane. For example, routers 12A, 12B, 12D, and 12E may be configured as part of a first plane (e.g., a first flexible-algorithm) and/or routers 12F, 12G, 12H, 12I, and 12J may be configured as part of a second plane (e.g., a second flexible-algorithm). That is, routers 12 may implement flexible-algorithm to steer traffic along a constraint-based segment routing path, such as a path along a particular plane.

To implement flexible-algorithm, routers 12 may, for example, advertise packets that (a) describe a set of constraints on the topology, (b) identify calculation-type, and (c) identify metric-type that are to be used to compute the best paths along the constrained topology. The combination of calculation-type, metric-type, and constraints is known as a "flexible-algorithm definition (FAD)," and may be identified by a flexible-algorithm identifier ("flexible-algorithm SID" or "flexible-algorithm label"), e.g., a value between 128 and 255. As one example, routers 12 may include the FAD and flexible-algorithm label within a type, length, and values ("TLV") of an OSPF packet or a sub-TLV of an ISIS packet. Further examples of flexible-algorithm are described in P. Psenak, Ed., et al., "IGP Flexible Algorithm," draft-ietf-lsr-flex-algo-00.txt," May 15, 2018, the entire contents of which is incorporated herein by reference.

To configure participation in a flexible-algorithm, routers 12 may, in addition to advertising a node label that uniquely identifies the router in the default segment routing domain (e.g., segment route without flexible-algorithm), advertise a node label for the flexible-algorithm for which the router is to participate in, along with the associated flexible-algorithm definition and flexible-algorithm label.

For example, assume routers 12A, 12B, 12C, and 12E are enabled for a first flexible-algorithm path computation corresponding to a first plane and routers 12F, 12G, 12H, 12I, and 12J are enabled for a second flexible-algorithm path computation corresponding to a second plane. In this example, router 12A may advertise a node label of 103 for a default segment route (e.g., flexible-algorithm label of 0), and a node label of 803 for the first flexible-algorithm, which is the node label of the default segment route offset by 700, to inform other routers that router 12A is reachable within the first flexible-algorithm by a node label of 803. Although illustrated with an offset value of 700 corresponding to the first flexible-algorithm, the offset value may be any value that offsets the node label of the default segment route to a value within the SRGB. Router 12A may advertise the node label of 803 with the flexible-algorithm label (e.g., 128) and flexible-algorithm definition associated with the first flexible-algorithm.

Similarly, router 12B may advertise a node label of 105 for the default segment route, the flexible-algorithm label of 128 and associated flexible-algorithm definition to indicate router 12B's participation in the first flexible-algorithm, and a node label of 805 for the first flexible-algorithm. Router 12D may advertise a node label of 109 for the default segment route, the flexible-algorithm label of 128 and associated flexible-algorithm definition to indicate router 12D's participation in the first flexible-algorithm, and a node label of 809 for the first flexible-algorithm. Router 12E may advertise a node label of 111 for the default segment route, the flexible-algorithm label of 128 and associated flexible-algorithm definition to indicate router 12E's participation in the first flexible-algorithm, and a node label of 811 for the first flexible-algorithm.

In response to receiving the flexible-algorithm advertisements, each of routers 12A, 12B, 12D, and 12E may, for example, store the node labels in one or more routing tables such that the router may perform a lookup of the one or more routing tables to compute a constraint-based shortest path. Based on routes determined from the path computation, each of routers 12A, 12B, 12D, and 12E may configure forwarding information to cause the router to steer traffic toward routers that are enabled for the first flexible-algorithm path computation. For example, each of routers 12A, 12B, 12D, and 12E may configure forwarding information that may swap a top label of a label stack with a node label for egress router 12E (e.g., 811) and send the packet along the routers participating in the first flexible-algorithm.

To configure participation in the second flexible-algorithm, routers 12F, 12G, 12H, 12I, and 12J may each advertise a node label for the default segment route, a node label that identifies the flexible-algorithm for which the router is to be included for path computation, and the flexible-algorithm label (e.g., 129). In the example of FIG. 1, router 12F may advertise a node label of 104 for a default segment route, and a node label of 904 for the second flexible-algorithm, which is the node label of the default segment route offset by 800, to inform other routers of the second flexible-algorithm that router 12F is reachable within the second flexible-algorithm by a node label of 904. In this example, the routers participating in the second flexible-algorithm advertise a node label of the default segment route that is offset by a value of 800. Router 12F may advertise the node label of 904 with the flexible-algorithm label (e.g., 129) and flexible-algorithm definition associated with the second flexible-algorithm.

Router 12G may advertise a node label of 106 for the default segment route, the flexible-algorithm label of 129 and associated flexible-algorithm definition that indicates router 12G's participation in the second flexible-algorithm, and a node label of 906 for the second flexible-algorithm. Router 12H may advertise a node label of 108 for the default segment route, the flexible-algorithm label of 129 and associated flexible-algorithm definition that indicates router 12H's participation in the second flexible-algorithm, and a node label of 908 for the second flexible-algorithm. Router 12I may advertise a node label of 110 for the default segment route, the flexible-algorithm label of 129 and associated flexible-algorithm definition that indicates router 12I's participation in the second flexible-algorithm, and a node label of 910 for the second flexible-algorithm. Router 12J may advertise a node label of 112 for the default segment route, the flexible-algorithm label of 129 and associated flexible-algorithm definition that indicates router 12J's participation in the second flexible-algorithm, and a node label of 912 for the second flexible-algorithm.

In response to receiving the flexible-algorithm advertisements, each of routers 12F, 12G, 12H, 12I, and 12J may, for example, store the node SIDs in one or more routing tables such that the router may perform a lookup of the one or more routing tables to compute constraint-based shortest paths. Based on routes determined from the path computation, each of routers 12F, 12G, 12H, 12I, and 12J may configure forwarding information to cause the router to steer traffic toward routers that are enabled to be included in the second flexible-algorithm path computation. For example, each of routers 12F, 12G, 12H, 12I, and 12J may configure forwarding information that may swap a top label of a label stack with a node label for egress router 12J (e.g., 912) and send the packet along the routers participating in the second flexible-algorithm.

For ease of illustration, the table provided below illustrates the node labels advertised for the default segment route, segment route with first flexible-algorithm, and segment route with second flexible-algorithm.

| Prefix | Router | Node SID for flexible-algorithm of 0 (Default SPF) | Node SID for first flexible-algorithm (first plane) | Prefix SID for second flexible-algorithm (second plane) |
|---|---|---|---|---|
| 3.3.3.3 | 12A | 103 | 803 | |
| 4.4.4.4 | 12F | 104 | | 904 |
| 5.5.5.5 | 12B | 105 | 805 | |
| 6.6.6.6 | 12G | 106 | | 906 |
| 7.7.7.7 | 12B | 107 | | |
| 8.8.8.8 | 12H | 108 | | 908 |
| 9.9.9.9 | 12D | 109 | 809 | |
| 10.10.10.10 | 12I | 110 | | 910 |
| 11.11.11.11 | 12E | 111 | 811 | |
| 12.12.12.12 | 12J | 112 | | 912 |

In some examples in which system 2 may include a multi-vendor network, one or more routers may not support flexible-algorithm techniques. In such examples, a router that does not support or enable flexible-algorithm techniques is typically not included in a constraint-based path computation for segment routing.

In accordance with the techniques described herein, a non-flexible-algorithm router, e.g., router 12C, is included in flexible-algorithm path computations even though router 12C does not support flexible-algorithm techniques. In the example of FIG. 1, an administrator may want to include router 12C as part of the path computation of the first flexible-algorithm (e.g., first plane including routers 12A, 12B, 12D, and 12E). In this example, any router that is enabled for the first flexible-algorithm path computation, e.g., 12E, may advertise a packet including information identifying the non-flexible-algorithm router 12C to inform other routers enabled for the first flexible-algorithm path computation that router 12C is also to be included in a path computation for the first flexible-algorithm path computation. For example, router 12E may advertise a packet including a loopback address of the non-flexible-algorithm router 12C, the flexible-algorithm label for which router 12C is to be included for path computation, and a node label for router 12C for the identified flexible-algorithm path computation (collectively, "non-flexible-algorithm router information"). The router that sends the route including the non-flexible-algorithm router information may be referred to herein as a segment routing mapping server (SRMS). In some examples, the SRMS may include the non-flexible-algorithm router information in an SID/Label Binding TLV for ISIS (as further described in FIG. 2A). In other examples, the SRMS may include the non-flexible-algorithm router information in an extended prefix range TLV for OSPF (as further described in FIG. 2B). In the example of FIG. 1, the SRMS, e.g., router 12E, advertises a packet (referred to herein as "SRMS packet") including the loopback address of non-flexible algorithm router 12C (e.g., 7.7.7.7), the flexible-algorithm label associated with the first flexible-algorithm path computation (e.g., 128), and a node label of router 12C for the first flexible-algorithm path computation (e.g., 807).

In response to receiving the SRMS packet, each of routers 12 may determine whether the router is enabled for the flexible-algorithm path computation identified in the SRMS packet. If the router is enabled for the flexible-algorithm path computation, the router stores the non-flexible-algorithm router information such that the router may perform a lookup of the information during path computation. If the router is not enabled for the flexible-algorithm path computation, the router ignores the SRMS packet. During path computation, the router determines whether a next-hop router is a router enabled for the flexible-algorithm path computation or whether the next-hop router is the non-flexible-algorithm router identified in the SRMS packet. If the router determines that the next-hop router is a router enabled for the flexible-algorithm, the router may configure forwarding information in accordance with "draft-ietf-lsr-flex-algo-00.txt" incorporated by reference above. If a router determines that the next-hop router is the non-flexible-algorithm router identified in the SRMS packet, the router may configure its forwarding information to cause the router to steer traffic to the non-flexible algorithm router.

For example, router 12A may receive the SRMS packet advertised by the SRMS (e.g., router 12E) and determines that the SRMS packet includes a flexible-algorithm label (e.g., 128) in which router 12A participates in. Router 12A may store the loopback address of the non-flexible-algorithm router 12C (e.g., 7.7.7.7) and use the loopback address for the first flexible-algorithm path computation.

During path computation for the first flexible-algorithm, router 12A may determine that router 12C is a next-hop router for one of the shortest paths to egress router 12E. In this case, router 12A may configure forwarding information to cause router 12A to steer traffic to non-flexible-algorithm router 12C. As one example, router 12A may configure its forwarding information that causes router 12A to push an adjacency label associated with the link between router 12A and router 12C to the top of a label stack of a data packet that is forwarded to router 12C. That is, a router that determines the next hop router is the non-flexible-algorithm router may push an adjacency label to steer the traffic to the non-flexible-algorithm router.

When router 12A receives a data packet from a source device (not shown), router 12A may inject the packet to network 4 with a label stack including an inner node label of egress router 12E and the adjacency label at the top of the label stack to steer the data packet to non-flexible-algorithm router 12C. When non-flexible-algorithm router 12C receives the data packet, router 12C may pop the adjacency label from the label stack such that the node label for router 12E is at the top of the label stack and send the data packet toward egress router 12E.

Routers 12F, 12G, 12H, 12I, and 12J (e.g., the routers enabled for the second flexible-algorithm) may each receive the SRMS packet advertised by router 12E and determines that the router is not enabled for the flexible-algorithm path computation identified by the flexible-algorithm label in the SRMS packet (e.g., flexible-algorithm label 128 for the first flexible-algorithm). In this case, routers 12F, 12G, 12H, 12I, and 12J ignores the SRMS packet.

In some examples, an administrator may want to include a plurality of non-flexible-algorithm routers when performing a flexible-algorithm path computation. Assume for example that router 12C and router 12D do not support flexible-algorithm. In this example, the SRMS, e.g., router 12E, may advertise SRMS packets for routers 12C and 12D, respectively, each including corresponding non-flexible-algorithm routing information as described above. Router 12A may receive the respective SRMS packets and determines that the SRMS packets each includes a flexible-algorithm label (e.g., 128) in which router 12A is enabled. Router 12A may store the loopback addresses of the non-flexible-algorithm routers 12C and 12D (e.g., 7.7.7.7 and 9.9.9.9) and use the loopback addresses for path computation.

During path computation, router 12A may determine that a next-hop router includes router 12C, and that router 12D is a next-hop router to router 12C. In this case, router 12A may configure its forwarding information to push a first adjacency label for the link between router 12A and router 12C to the top of a label stack followed by a second adjacency label for the link between router 12C and router 12D. In this way, when router 12C receives a data packet with the label stack described above from router 12A, router 12C may pop the first adjacency label from the top of the label stack and forward the data packet to router 12D with the second adjacency label at the top of the label stack such that when router 12D receives the data packet with the second adjacency label at the top of the label stack, router 12D may pop the second adjacency label from the label stack and forward the packet toward egress router 12E.

The techniques may provide one or more technical advantages. For example, by using existing TLVs for ISIS or OSPF, no protocol change is required to implement flexible-algorithm path computation for routers that do not support or enable flexible-algorithm path computation. Moreover, in a multi-vendor network where one or more of the routers do not support flexible-algorithm path computation, the techniques described herein simplifies implementation of flexible-algorithm path computation by enabling the implementation of flexible-algorithm path computation in phases without having to implement flexible-algorithm path computation for all the routers in the network at the same time.

FIGS. 2A and 2B each illustrates an example packet that includes non-flexible-algorithm routing information, in accordance with techniques described herein. For example, FIG. 2A illustrates an example packet 200 including a Type/Length/Value (TLV) that includes non-flexible-algorithm routing information, in accordance with techniques described herein. In the example of FIG. 2A, packet 200 may represent a SID/Label Binding TLV for ISIS. Packet 200 may include, inter alia, fields including: (1) loopback address of a non-flexible-algorithm router, (2) flexible-algorithm label ("Algo" in FIG. 2A), and (3) node label for the flexible-algorithm path computation ("index" in FIG. 2A). Packet 200 may include other fields that may be configured in accordance with L. Ginsberg, et al., "IS-IS Extensions for Advertising Router Information" RFC 7981, October 2016, the entire contents of which are incorporated by reference herein.

A loopback address field of packet 200 may be a loopback address of a non-flexible-algorithm router, which indicates the prefix for which to include in a flexible-algorithm path computation. In accordance with the example described in FIG. 1, packet 200 of FIG. 2A may include the loopback address of router 12C (e.g., 7.7.7.7/32).

The flexible-algorithm label field is a unique identifier associated with a flexible-algorithm path computation. The identifier may be a single octet value between 128 and 255. In the example of FIG. 2A, packet 200 may include a flexible-algorithm label with a value of 128 that uniquely identifies a first flexible-algorithm path computation. Although illustrated with a flexible-algorithm label with a value of 128, the flexible-algorithm label may be any value between 128 and 255. For example, for a second flexible-algorithm path computation, packet 200 would include a flexible-algorithm label with a value of 129.

The node label field is a unique identifier of the non-flexible-algorithm router for the first-flexible algorithm path computation. For example, packet 200 includes a node label value of 807 to indicate to other routers enabled for the first flexible-algorithm that the non-flexible-algorithm router is reachable in a path computed by the first flexible-algorithm by the node label value of 807.

FIG. 2B illustrates an example packet 210 including a Type/Length/Value (TLV) that includes non-flexible-algorithm routing information, in accordance with techniques described in this disclosure. In the example of FIG. 2B, packet 210 may represent an extended prefix range TLV for OSPF. Packet 210 may include, inter alia, fields including: (1) loopback address of a non-flexible-algorithm router, (2) flexible-algorithm SID ("Algo" in FIG. 2B), and (3) node SID associated with the flexible-algorithm path computation ("index" in FIG. 2B). Packet 210 may include other fields that may be configured in accordance with A Lindem, Ed., et al., "Extensions to OSPF for Advertising Optional Router Capabilities" RFC 7770, February 2016, the entire contents of which are incorporated by reference herein.

A loopback address field of packet 210 may be a loopback address of a non-flexible-algorithm router, which indicates the prefix for which to include in a flexible-algorithm path computation. In accordance with the example described in FIG. 1, packet 210 of FIG. 2B may include the loopback address of router 12C (e.g., 7.7.7.7).

The flexible-algorithm label field is a unique identifier associated with a flexible-algorithm path computation. The identifier may be a single octet value between 128 and 255. In the example of FIG. 2B, packet 210 may include a flexible-algorithm label with a value of 128 that uniquely identifies a first flexible-algorithm path computation. Although illustrated with a flexible-algorithm label with a value of 128, the flexible-algorithm label may be any value between 128 and 255. For example, for a second flexible-algorithm path computation, packet 210 may include a flexible-algorithm label with a value of 129.

The node label field is a unique identifier of the non-flexible-algorithm router for the first-flexible algorithm path computation. For example, packet 210 includes a node label value of 807 to indicate to other routers enabled for the first flexible-algorithm that the non-flexible-algorithm router is reachable in a path computed by the first flexible-algorithm by the node label value of 807.

Figure 3:
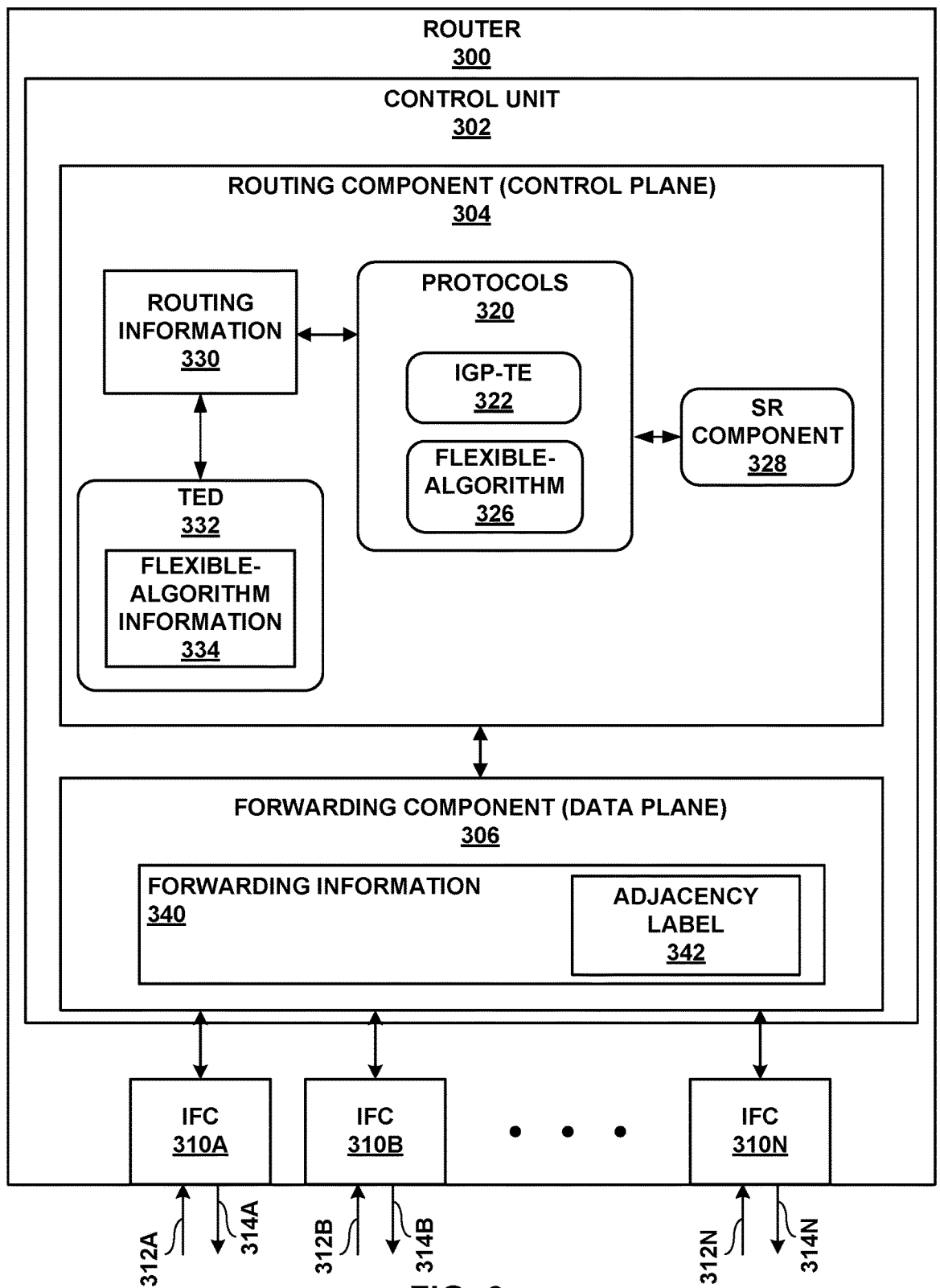
FIG. 3 is a block diagram illustrating an example router capable of operating in accordance with the techniques described herein.

FIG. 3 is a block diagram illustrating an example router 300 that performs various aspects of the techniques described in this disclosure. Router 300 may represent any of routers 12 of FIG. 1. While described with respect to router 300, the techniques may be implemented by any other type of network device capable of implementing at least routing protocols including a segment routing protocol. Thus, while described with respect to router 300, the techniques should not be limited to router 300 described with respect to the example of FIG. 3.

In the example of FIG. 3, router 300 includes interface cards 310A-310N ("IFCs 310") that receive and send data units, such as packet flows, via network links 312A-312N and 314A-314N, respectively. Router 300 may include a chassis (not shown) having a number of slots for receiving a set of cards, including IFCs 310. Each card may be inserted into a corresponding slot of the chassis for electrically coupling the card to routing component 306 via high-speed switch (not shown), which may comprise, for example, switch fabric, switchgear, a configurable network switch or hub, or other high-speed switching mechanisms. IFCs 310 may be coupled to network links 312A-312N and 314A-314N via a number of physical interface ports (not shown). Generally, IFCs 310 may each represent one or more network interfaces by which router 300 may interface with links of a network.

In general, router 300 may include a control unit 302 that determines routes of received packets and forwards the packets accordingly via IFCs 310. In the example of FIG. 3, control unit 302 includes routing component 304 (control plane) that configures and controls packet forwarding operations applied by packet forwarding component 306 (data plane).

Routing component 304 provides an operating environment for various routing protocols 320 that execute at different layers of a network stack. Routing component 304 is responsible for the maintenance of routing information 330 to reflect the current topology of a network and other network entities to which router 300 is connected. In particular, routing protocols periodically update routing information 330 to accurately reflect the topology of the network and other entities based on routing protocol messages received by router 300. The protocols may be software processes executing on one or more processors. For example, routing component 304 includes network protocols that operate at a network layer of the network stack, which are typically implemented as executable software instructions.

In the example of FIG. 3, protocols 320 may include IGP-TE 322 to implement an IGP protocol with traffic engineering extensions to exchange link state information, and facilitate forwarding of packets or other data units between endpoint devices. In some examples, IGP-TE component 322 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, Internet Draft for the Network Working Group, by A. Lindem et al., entitled "OSPFv3 LSA Extendibility," dated July 2013, draft-acee-ospfv3-lsa-extend-01.txt, and A Lindem, Ed., et al., "Extensions to OSPF for Advertising Optional Router Capabilities" RFC 7770, February 2016, each of which are incorporated by reference as if set forth in their respective entireties. In some examples, IGP-TE component 322 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990, which is incorporated by reference in its entirety. IGP-TE component may include traffic extensions that support traffic engineering with Multi-protocol Label Switching (MPLS), as described in Internet Draft for Network Working Group, by Tony Li et al., entitled "IGP Requirements for Traffic Engineering with MPLS," dated February 1999, draft-li-mpls-igp-te-00.txt, which is incorporated by reference in its entirety. IGP-TE component may also include extensions as described in L. Ginsberg, et al., "IS-IS Extensions for Advertising Router Information" RFC 7981, October 2016, the entire contents of which are incorporated by reference herein.

Routing component 304 includes a segment routing (SR) component 328 to implement segment routing techniques for IGP protocols (e.g., IS-IS and OSPF) for specifying how router 300 may advertise node or adjacency labels. As described in FIG. 1, these node or adjacency labels may steer a packet through a controlled set of instructions, called segments, by prepending the packet with a segment routing header.

Protocols 320 may also include flexible-algorithm protocol 324. For example, flexible-algorithm protocol 326 may be in accordance with "draft-ietf-lsr-flex-algo-00.txt," as described above. For example, routing component 304 may execute flexible-algorithm protocol 324 to advertise flexible-algorithm advertisements to inform other routers in the network that router 300 is enabled for a flexible-algorithm path computation and/or receive flexible-algorithm advertisements to learn of other routers in the network that are enabled for the flexible-algorithm path computation.

By executing the routing protocols, routing component 304 identifies existing routes through the network and determines new routes through the network. Routing component 304 stores routing information 330 that includes, for example, known routes through the network. Forwarding component 306 stores forwarding information 334 that includes destinations of output links 314. Forwarding information 340 may be generated in accordance with routing information 330.

Routing component 304 may include a Traffic Engineering Database (TED) 332 for storing e.g., path information for segment routed LSPs. In some examples in which router 300 supports segment routing (e.g., SPRING), TED 332 may include segment identifier information. In some examples, TED 332 may also include flexible-algorithm information 334 that includes the node labels of routers enabled for a flexible-algorithm path computation and the associated flexible-algorithm label and flexible-algorithm definition. TED 332 may be in the form of a variety of data structures, such as a number of tables, link lists, radix trees, databases, flat files, or other data structures.

In accordance with the techniques described in this disclosure, router 300 may facilitate the inclusion of a non-flexible-algorithm router in flexible-algorithm path computations even though the non-flexible-algorithm router does not support or enable flexible-algorithm. In an example where router 300 is a router enabled for flexible-algorithm (e.g., first flexible-algorithm), router 300 may generate a packet, e.g., SRMS packet, including non-flexible-algorithm router information that is advertised to other routers enabled for the flexible-algorithm path computation to inform the other routers enabled for the flexible-algorithm path computation to also include the non-flexible-algorithm router when performing the flexible-algorithm path computation. For example, routing component 304 of router 300 may use the IGP-TE component 322 to configure an ISIS packet (in accordance with RFC 7981) to include a loopback address of the non-flexible-algorithm router (e.g., router 12C of FIG. 1), the flexible-algorithm label for which the non-flexible-algorithm router is to be included for path computation, and a node label of the non-flexible-algorithm router for the flexible-algorithm path computation in an SID/Label Binding TLV of the ISIS packet. In some examples, routing component 304 of router 300 may use the IGP-TE component 322 to configure an OSPF packet (in accordance with RFC 7770) to include a loopback address of the non-flexible-algorithm router (e.g., router 12C of FIG. 1), the flexible-algorithm label for which the non-flexible-algorithm router is to be included for path computation, and a node label of the non-flexible-algorithm router for the flexible-algorithm in an extended prefix range TLV of the OSPF packet. Router 300 may advertise the SRMS route to other routers in the network.

In an example where router 300 is a flexible-algorithm router that receives an SRMS packet, routing component 304 may perform a lookup of TED 332 to determine whether the flexible-algorithm information 334 includes the flexible-algorithm label that is included in the SRMS packet. If routing component 304 determines that router 300 participates in the flexible-algorithm identified in the SRMS packet, routing component 304 may store the non-flexible-algorithm router information in TED 332. In this way, when routing component 304 performs a flexible-algorithm path computation, routing component 304 may also include the non-flexible-algorithm router information stored in TED 332 as part of the path computation.

During path computation, routing component 304 may determine, e.g., from routing information 330, whether a next-hop router to router 300 is a router that is enabled for the flexible-algorithm path computation or whether the next-hop router is the non-flexible-algorithm router identified in the SRMS packet. If routing component 304 determines that the next-hop router is the non-flexible-algorithm router, routing component 304 may configure forwarding information 340 to include information to steer traffic to the non-flexible-algorithm router. For example, routing component 304 may configure forwarding information 340 to include instructions to cause router 300 to push an adjacency label 342 to the top of a label stack. In this way, when router 300 receives a data packet and determines that the data packet is to be sent to an outgoing interface (e.g., one of IFCs 310) toward the non-flexible-algorithm router, router 300 may push the adjacency label 342 to the top of a label stack before forwarding the data packet to the non-flexible-algorithm router.

In an example where router 300 is the non-flexible-algorithm router, routing component 304 may configure forwarding information 340 to include instructions that cause router 300 to pop the adjacency label from the top of a label stack applied to incoming traffic before forwarding the data packet to its next-hop. In this way, when router 300 receives a data packet that includes a label stack having an adjacency label at the top of the label stack, router 300 may determine from its forwarding information 340 to pop the adjacency label from the top of the label stack before forwarding the data packet to the next-hop.

Although described for purposes of example with respect to a router, router 300 may be more generally a network device having routing functionality, and need not necessarily be a dedicated routing device. The architecture of router 300 illustrated in FIG. 3 is shown for example purposes only. The techniques of this disclosure are not limited to this architecture. In other examples, router 300 may be configured in a variety of ways. In one example, some of the functionally of control unit 302 may be distributed within IFCs 310. In another example, control unit 302 may comprise a plurality of packet forwarding engines operated as slave routers.

Control unit 302 may be implemented solely in software, or hardware, or may be implemented as a combination of software, hardware, or firmware. For example, control unit 302 may include one or more processors that execute program code in the form of software instructions. In that case, the various software components/modules of control unit 302 may comprise executable instructions stored on a computer-readable storage medium, such as computer memory or hard disk.

Figure 4:
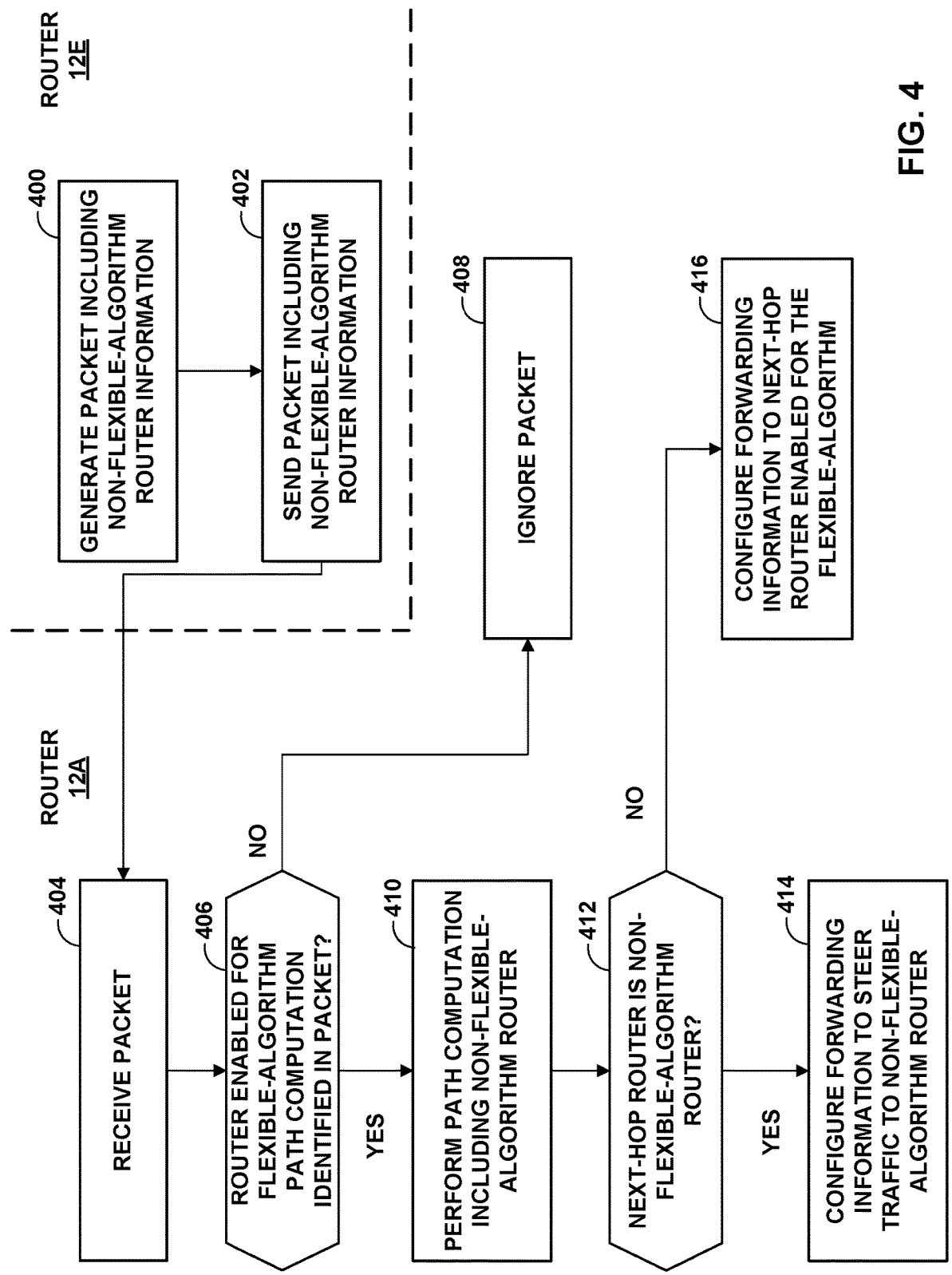
FIG. 4 is a flowchart illustrating an example operation of a router capable of operating in accordance with the techniques described herein.

FIG. 4 is a flowchart illustrating an example operation of a router capable of operating in accordance with the techniques described herein. FIG. 4 will be explained with reference to routers 12 of FIG. 1 and router 300 of FIG. 3.

In the example of FIG. 4, router 12E, as the SRMS, may generate a packet, e.g., SRMS packet, including non-flexible-algorithm router (e.g., router 12C) information that is advertised to other routers enabled for the flexible-algorithm path computation to include the non-flexible-algorithm router when performing the flexible-algorithm path computation (400). For example, routing component 304 of router 300 may use the IGP-TE component 322 to configure an ISIS packet (in accordance with RFC 7981) or OSPF packet (in accordance with RFC 7770) including a loopback address of the non-flexible-algorithm router (e.g., router 12C of FIG. 1), the flexible-algorithm label for which the non-flexible-algorithm router is to be considered for path computation, and a node label for the non-flexible-algorithm router that may be used to steer traffic to the non-flexible-algorithm router.

Router 12E may send the SRMS packet to other routers in the network (402). Router 12A may receive the SRMS packet (404) and may determine whether router 12A is enabled for the flexible-algorithm path computation identified in the SRMS packet (406). For example, routing component 304 of router 12A may perform a lookup of TED 332 to determine whether the flexible-algorithm information 334 includes the flexible-algorithm label that is included in the SRMS packet. If routing component 304 of router 12A determines that it is enabled for the flexible-algorithm path computation identified in the SRMS packet ("YES" branch of step 406), routing component 304 may store the non-flexible-algorithm router information in TED 332. In this way, when router 12A performs a flexible-algorithm path computation, router 12A may include router 12C as part of the path computation (410). If routing component 304 of router 12A determines that it is not enabled for the flexible-algorithm path computation identifies in the SRMS packet ("NO" branch of step 406), router 12A ignores the SRMS packet (408).

During path computation, router 12A may determine whether a next-hop router is the non-flexible-algorithm router identified in the SRMS packet (412). If router 12A determines that the next-hop router is the non-flexible-algorithm router ("YES" branch of step 412), router 12A may configure forwarding information to steer traffic to the non-flexible-algorithm router (414). For example, routing component 304 of router 12A may configure forwarding information 340 to include instructions to cause router 12A to push an adjacency label 342 to the top of a label stack. In this way, when router 12A receives a data packet and determines that the data packet is to be sent to an outgoing interface (e.g., one of IFCs 310) toward the non-flexible-algorithm router, router 12A may push the adjacency label 342 to the top of a label stack before forwarding the data packet to the non-flexible-algorithm router.

If router 12A determines that the next-hop router is not the non-flexible-algorithm router ("NO" branch of step 412), router 12A configures forwarding information to forward the traffic to the next-hop router that is participating in the flexible-algorithm (416). For example, if router 12A determines that the next-hop router is a router participating in the flex-algorithm, the router may configure forwarding information 340 in accordance with "draft-ietf-lsr-flex-algo-00.txt" incorporated by reference above.

The techniques described herein may be implemented in hardware, software, firmware, or any combination thereof. Various features described as components, units or modules may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-spe-

What is claimed is:

1. A method comprising:
generating, by a network device of a plurality of network devices enabled for a flexible-algorithm path computation, a packet including information identifying a non-flexible-algorithm network device that is not enabled for the flexible-algorithm path computation, wherein the information comprises a loopback address of the non-flexible-algorithm network device, an identifier for the flexible-algorithm path computation, and an identifier that identifies the non-flexible-algorithm network device for the flexible-algorithm path computation; and
sending, by the network device and to at least one other network device of the plurality of network devices, the packet to cause the at least one other network device to include the non-flexible-algorithm network device in the flexible-algorithm path computation.

2. The method of claim 1,
wherein the identifier for the flexible-algorithm path computation comprises a flexible-algorithm label and a flexible-algorithm definition,
wherein the flexible-algorithm definition comprises a description of a set of constraints on the flexible-algorithm path computation, an identification of a calculation-type, and an identification of a metric-type, and
wherein the flexible-algorithm label is a label identifying the flexible-algorithm path computation.

3. The method of claim 1,
wherein the packet comprises an Intermediate System-Intermediate System (ISIS) packet, and
wherein the information identifying the non-flexible-algorithm network device is included in the sub-type, length, and value (sub-TLV) of the ISIS packet.

4. The method of claim 1,
wherein the packet comprises an Open Shortest Path First (OSPF) packet, and
wherein the information identifying the non-flexible-algorithm network device is included in the type, length, and value (TLV) of the OSPF packet.

5. The method of claim 1, wherein the network device is a segment routing mapping server.

6. The method of claim 1, wherein the packet comprises a first packet including information identifying a first non-flexible-algorithm network device, wherein the information comprises a loopback address of a first network device that is not associated with the flexible-algorithm path computation, the method further comprising:
generating, by the network device, a second packet including information identifying a second non-flexible-algorithm network device, wherein the information identifying the second non-flexible-algorithm network device comprises a loopback address of a second network device that is not associated with the flexible-algorithm path computation, the identifier for the flexible-algorithm path computation, and an identifier for the second non-flexible-algorithm network device for the flexible-algorithm path computation; and
sending, by the network device and to the plurality of network devices, the second packet to include the second non-flexible-algorithm network device in the flexible-algorithm path computation.

7. A method comprising:
receiving, by a network device of a plurality of network devices enabled for a flexible-algorithm path computation, a packet including information identifying a non-flexible-algorithm network device that is not enabled for the flexible-algorithm path computation, wherein the information comprises a loopback address of the non-flexible-algorithm network device, an identifier for the flexible-algorithm path computation, and an identifier for the non-flexible-algorithm network device for the flexible-algorithm path computation;
determining, by the network device, whether the network device is associated with the identifier for the flexible-algorithm path computation included in the packet; and
performing, by the network device and in response to determining that the network device is associated with the identifier for the flexible-algorithm path computation included in the packet, the flexible-algorithm path computation including the non-flexible-algorithm network device.

8. The method of claim 7, further comprising:
determining, by the network device, whether a next-hop of the network device is the non-flexible-algorithm network device; and
configuring, by the network device and in response to determining that the next-hop of the network device is the non-flexible-algorithm network device, forwarding information to steer traffic toward the non-flexible-algorithm network device.

9. The method of claim 8, wherein configuring the forwarding information to steer traffic toward the non-flexible-algorithm network device comprises:
configuring forwarding information to cause the network device to push an adjacency label associated with the non-flexible-algorithm network device.

10. The method of claim 7, further comprising:
receiving, by the network device, traffic from a source device;
pushing, by the network device, the adjacency label associated with the non-flexible-algorithm network device to a top of a label stack that is appended to the traffic; and
forwarding, by the network device, the traffic to the non-flexible-algorithm network device.

11. The method of claim 10, further comprising:
receiving, by the non-flexible-algorithm network device, the traffic;
popping, by the non-flexible-algorithm network device, the adjacency label from the label stack of the traffic; and
forwarding, by the non-flexible-algorithm network device, the traffic toward a next-hop network device included in the plurality of network devices.

12. The method of claim 7, wherein receiving the packet comprises receiving the packet from a segment routing mapping server (SRMS), wherein the SRMS is included in the plurality of network devices associated with the flexible-algorithm.

13. A network device of a plurality of network devices enabled for a flexible-algorithm path computation, comprising:

a memory;
one or more programmable processors operably coupled to the memory, wherein the one or more programmable processors are configured to:
  generate a packet including information identifying a non-flexible-algorithm network device that is not enabled for the flexible-algorithm path computation, wherein the information comprises a loopback address of the non-flexible-algorithm network device, an identifier for the flexible-algorithm path computation, and an identifier that identifies the non-flexible-algorithm network device for the flexible-algorithm path computation; and
  send, to at least one other network device of the plurality of network devices, the packet to cause the at least one other network device to include the non-flexible-algorithm network device in the flexible-algorithm path computation.

14. The network device of claim 13,
wherein the identifier for the flexible-algorithm path computation comprises a flexible-algorithm label and a flexible-algorithm definition,
  wherein the flexible-algorithm definition comprises a description of a set of constraints on the flexible-algorithm path computation, an identification of a calculation-type, and an identification of a metric-type, and
  wherein the flexible-algorithm label is a label identifying the flexible-algorithm path computation.

15. The network device of claim 13,
wherein the packet comprises an Intermediate System-Intermediate System (ISIS) packet, and
wherein the information identifying the non-flexible-algorithm network device is included in the sub-type, length, and value (sub-TLV) of the ISIS packet.

16. The network device of claim 13,
wherein the packet comprises an Open Shortest Path First (OSPF) packet, and
wherein the information identifying the non-flexible-algorithm network device is included in the type, length, and value (TLV) of the OSPF packet.

17. The network device of claim 13, wherein the network device is a segment routing mapping server.

18. A network device of claim 13, wherein the one or more programmable processors are further configured to:
  receive, from a segment routing mapping server of the plurality of network devices, a packet including information identifying a non-flexible-algorithm network device, wherein the information comprises a loopback address of a network device that is not enabled for the flexible-algorithm, an identifier for the flexible-algorithm path computation, and an identifier for the non-flexible-algorithm network device for the flexible-algorithm path computation;
  determine whether the network device is associated with the identifier for the flexible-algorithm path computation included in the packet; and
  perform, in response to determining that the network device is associated with the identifier for the flexible-algorithm path computation included in the packet, the flexible-algorithm path computation including the non-flexible-algorithm network device.

19. The network device of claim 13, wherein the one or more programmable processors are further configured to:
  determine whether a next-hop of the network device is the non-flexible-algorithm network device; and
  configure, in response to determining that the next-hop of the network device is the non-flexible-algorithm network device, forwarding information to steer traffic toward the non-flexible-algorithm network device.

20. The network device of claim 19, wherein, to configure the forwarding information to steer traffic toward the non-flexible-algorithm network device, the one or more programmable processors are further configured to:
  configure forwarding information to cause the network device to push an adjacency label associated with the non-flexible-algorithm network device.

* * * * *